United States Patent [19]
Hawkins

[11] 3,971,733
[45] July 27, 1976

[54] WATER-WETTABLE WAX COMPOSITION AND PROCESS FOR PRODUCING THE SAME

[75] Inventor: Edwin Francis Hawkins, Cockeysville, Md.

[73] Assignee: Allied Chemical Corporation, New York, N.Y.

[22] Filed: Dec. 17, 1974

[21] Appl. No.: 533,572

[52] U.S. Cl.............................. 252/311; 252/314; 252/8.6; 252/8.75; 106/271
[51] Int. Cl.².......................................... B01J 13/00
[58] Field of Search ........... 252/311, 314, 8.6, 8.75; 106/271

[56] References Cited
UNITED STATES PATENTS

| | | | |
|---|---|---|---|
| 2,764,499 | 9/1956 | Porter............................. | 252/311 X |
| 3,071,479 | 1/1963 | Fulenwider..................... | 106/271 X |
| 3,551,169 | 12/1970 | Congdon.......................... | 252/311 X |
| 3,574,135 | 4/1971 | Sampson et al................. | 252/314 X |
| 3,791,839 | 2/1974 | Cushman et al................ | 106/271 X |
| 3,819,530 | 6/1974 | Ratledge et al................ | 106/271 X |

*Primary Examiner*—Benjamin R. Padgett
*Assistant Examiner*—E. Suzanne Parr
*Attorney, Agent, or Firm*—Fred L. Kelly

[57] ABSTRACT

A water-wettable wax composition comprising a particulate hydrocarbon wax and an emulsifier which is (*a*) a hydrophilic oil-in-water emulsifier having an HLB of from about 10 to about 20, or (*b*) mixtures of said hydrophilic oil-in-water emulsifier with a lipophilic emulsifier, wherein there is sufficient hydrophilic emulsifier present to render the overall mixture hydrophilic, said particulate hydrocarbon wax having a particle size of about 1 to 5 microns, the emulsifier being uniformly dispersed in the wax particles.. This wax composition forms a homogeneous water suspension suitable for imparting lubricity.

11 Claims, No Drawings

WATER-WETTABLE WAX COMPOSITION AND PROCESS FOR PRODUCING THE SAME

BACKGROUND OF THE INVENTION

This invention relates to a water-wettable wax composition and to a process for its preparation. More particularly, it relates to an improved water-wettable wax composition suitable for preparing an extremely small particle size emulsion in water, which emulsion is more uniform and more stable than conventional wax emulsions.

Waxes are usually defined as unctuous, fusible, viscous to solid substances, having a characteristic waxy luster, which are insoluble in water but normally soluble in carbon bisulfide, benzene, etc. Waxes are usually grouped according to their origin as follows: (a) animal (beeswax, stearic acid, etc.), (b) mineral (ozokerite, paraffin, ceresin, etc.), (c) vegetable (carnauba, bayberry, etc.). This invention relates particularly to hydrocarbon waxes, e.g., polyolefin waxes and waxes obtained from the distillation of paraffin-base petroleum. Petroleum waxes are particularly preferred because of their normal availability and relatively low cost.

It is known to prepare water-wettable wax compositions suitable for forming emulsions in water. Such emuslions are used to impart lubricity, for example, they may be used as textile lubricants, in laundering, in floor polishes, and in preparation of inks. An exemplary patent in this field is U.S. Pat. No. 3,450,599 to G. S. Schaufelberger. This patent discloses a dicarboxylic acid modified polyolefin wax emulsion particularly suitable for application to textile fibers and fabrics to impart characteristics such as softness, sheen, durability, shrink resistance, and the like.

U.S. Pat. No. 3,519,562 discloses a textile lubricant comprising an oxidized Fishcer-Tropsch wax and an emulsifier which is a catonic quaternary ammonium compound.

Although the prior art in this field is valuable, the known water-wettable waxes are relatively expensive and/or do not demonstrate rapid or uniform wetting in water suspensions. Accordingly, research has been continued in an effort to discover a relatively economic wax composition showing significantly more rapid and uniform wetting in water suspensions.

SUMMARY OF THE INVENTION

It is an object of the present invention to provide a water-wettable wax composition and a process for its preparation.

It is another object to provide a water-wettable wax composition suitable for preparing an extremely small particle size emulsion in water, which emulsion is more uniform and more stable than conventional wax emulsions.

It is another object to provide finishing agents of relatively very great molecular weight for improving abrasion resistance of fibers.

The water-wettable wax composition of the present invention comprises a particulate hydrocarbon wax having a chain length of from about 30 to 55 carbon atoms, a melting point ranging from about 65°C. to about 105°C., and a penetration ranging from about 1 to about 6; and an emulsifier selected from the group consisting of:

a. a hydrophilic oil-in-water emulsifier having an HLB of from about 10 to about 20, and
b. mixtures of said hydrophilic oil-in-water emulsifier with a lipophilic emulsifier, wherein there is sufficient hydrophilic emulsifier present to render the overall mixture hydrophilic; said particulate hydrocarbon wax having a particle size of 1 to 5 microns the ratio of total emulsifier to said particulate hydrocarbon wax being about 3 to 20 percent by weight.

The waxes employed according to the instant invention are preferably solid alkanes or polyolefins, i.e., they are normally solid at room temperature, having a melting point ranging from about 65°C. to about 105°C. Typically, these waxes have about 30 to 55 carbon atoms. They have a penetration ranging from about 1 to about 6. Melting point determination follows the general procedure of A.S.T.M D-127-Melting Point of Petroleum and Microcrystalline Waxes. The method for needle penetration determination follows the general procedure of A.S.T.M. for Needle Penetration of Petroleum Waxes. A penetrometer conforming to the specifications outlined in A.S.T.M. D-217 is used with a total load of 100 grams for the needle and all attachments.

The hydrocarbon waxes with melting points below about 65°C. and penetrations above about 6 impart poor lubricity. Hydrocarbon waxes with melting points above 105°C. and penetrations below about 1 tend to form relatively poor suspensions in water.

Suitable emulsifiers within the scope of the present invention are those surfactants which form oil-in-water emulsions, i.e., hydrophilic emulsifiers having an HLB number greater than about 10 (on the HLB scale of 0–20), including hydrophilic polyoxyethylene derivatives of various phenols, common fatty acids and alcohols. Among the suitable emulsifiers are hydrophilic polyoxyethylene derivatives of sorbitan monolaurate, sorbitan monopalmitate, sorbitan mono and tristearate, sorbitan mono- and trioleate, nonylphenol, lauryl alcohol, stearyl alcohol, and oleyl alcohol. The emulsifier may also be a mixture of hydrophilic and lipophilic emulsifiers (such as partial esters of common fatty acids) so long as there is sufficient hydrophilic emulsifiers present to render the overall mixture hydrophilic. Sodium lauryl sulfate and sodium N-methyl-N-oleoyl taurate are preferred emulsifiers. Other suitable emulsifiers include the oleic acid ester of sodium sulfonate and various organic phosphate esters.

Optionally, the water-wettable wax composition may contain up to 5 percent, based on the weight of the hydrocarbon wax, of a dispersing agent such as sodium lignin sulfonate, and up to 10 percent of a conditioning agent such as finely ground calcium or magnesium silicate or precipitated silica. However, these additives are not considered critical to the invention.

The water-wettable wax composition of the present invention can be suspended in at least about 55% water by weight of the total composition. If less than 55% water is used the mixture will not be readily pourable and mixing will be difficult. The suspension preferred for sale is one which contains a high percentage of solids so that it can be shipped inexpensively and at the same time, one that is liquid or pourable so that it is easily handled and readily diluted with water.

A water-wettable wax composition within the scope of the present invention can be prepared in an exemplary manner described as follows: The hydrocarbon wax used in the process is desirably in the form of flakes but may be utilized in more finely divided form. The emulsifier is preferably mixed with the wax at substantially ambient temperatures. The mixing may be accomplished with a ribbon-type mixer or a drum-type rotating mixer. The resulting mixture is then ground in a jet mill to form a particulate product having a particulate size of about 1 to 5 microns, the emulsifier being uniformly dispersed in said wax particles. The jet mill grinds by the action of the particles of material grinding against each other in a high energy gas flow (air and nitrogen have been used) without any moving mill parts. As the wax particles are reduced in size by this grinding action, the finer particles are separated by centrifugal force and pass from the grinding chambers out of the mill into a collection system such as a filter bag. In a jet mill, the cooling effect of the grinding fluid as it expands at the jets more than compensates for the slight heat generated during grinding. A jet mill suitable for use in the present process is the "Jet-O-Mizer" mill built by Fluid Energy Processing and Equipment Company.

DESCRIPTION OF THE PREFERRED EMBODIMENTS

The invention will now be described in the following specific examples which are to be regarded solely as illustrative and not as restricting the scope of the invention. In these examples, parts and percentages are by weight.

EXAMPLE 1

About 94 parts of a flaked paraffin hydrocarbon wax having a chain length ranging from 35 to 50 carbon atoms, a melting point range of 75° to 95°C. and a penetration range from 3 to 5, about 5 parts of a commercially available sodium lauryl sulfate emulsifier, and about 1 part of an ultra-fine silica "Hi-Sil 233" were thoroughly mixed in a drum-type rotating mixer at about 25°–30°C. The ultra-fine silica is preferably incorporated into the mixture as a grinding aid. Other suitable grinding aids are finely ground calcium or magnesium silicate. The resulting mixture was then finely ground in a conventional jet mill to form a particulate water-wettable wax composition having a particle size of about 1 to 3 microns, the emulsifier being uniformly dispersed in the particles. The jet mill was operated at about 25°–30°C. with use of air at 100 p.s.i.g.

In other tests, the flaked paraffin hydrocarbon wax was ground to a particle size of about 3 microns in the jet mill prior to use in the process of the present invention. The resulting final product was similar to that produced directly from flakes. Accordingly, it is preferred for economic reasons to utilize flaked wax as starting material in the present process. However, both water-wettable wax products formed emulsions very readily when stirred with at least about 55–65% water. Such emulsions are useful as a textile lubricant as described hereinafter.

EXAMPLE 2

The procedure of Example 1 was repeated except that no ultra-fine silica was incorporated. In a comparative test, the water-wettable wax product of Example 1 was found significantly more water-wettable when stirred with water than was the wax product of the present example. This is surprising because no visual difference in the products could be observed. It appears that the presence of the emulsifier alone is not sufficient to produce wettability even when the wax is finely ground with the emulsifier in the jet mill.

EXAMPLE 3

The procedure of Example 1 was followed except that 5 parts of a commercially available sodium-N-methyl-N-oleoyl taurate emulsifier was substituted for the emulsifier of Example 1. In terms of water wettability, the was was not significantly different from the wax product of Example 1.

EXAMPLE 4

The procedure of Example 3 was followed except that only 3 parts of the emulsifier was incorporated. The resulting product was water-wettable but significantly less wettable than the product of Example 3.

EXAMPLE 5

The procedure of Example 1 was followed except that about 3 parts of a commercially available sodium lignin sulfonate dispersing agent was incorporated into the wax composition, in addition to the emulsifier. The resulting product was found to be readily water wettable in textile lubricant compositions containing 60–80 percent water, and the resulting emulsions were significantly more stable in storage than emulsions formed from the product of Example 1. Some additional stability was noted when 1 to 3 parts of a lipophilic emulsifier (such as partial esters of common fatty acids) was incorporated in the above-described water-wettable wax composition.

EXAMPLE 6

Several textile treatment compositions were prepared from the water-wettable wax product of Example 1 by stirring with water to form emulsions containing 2.5, 5 and 10% solids. Squares of cotton fabric were immersed in each of these solutions. One-half of each square was air dried for 2 hours at room temperature. The other half of each square was oven dried at about 100°C. for 45 minutes. The post treated fabric was water resistant, with applied water "balling up".

While not necessary, post-heat treatmemt of coated fabric at 100°–130°C. for 1 to 60 minutes provides a superior product in terms of tear strength and abrasion resistance.

I claim:

1. A textile lubricating water-wettable wax composition consisting essentially of a particulate hydrocarbon wax having a chain length of from about 30 to 55 carbon atoms, a melting point ranging from about 65°C. to about 105°C., and a penetration ranging from about 1 to about 6; about 1 to 10 percent based on the weight of said hydrocarbon wax of a conditioning agent selected from the group consisting of a finely-ground calcium silicate, magnesium silicate, and precipitated ultra-fine silica, and an emulsifier selected from the group consisting of:
  a. a hydrophilic oil-in-water emulsifier having an HLB of from about 10 to about 20, and
  b. mixtures of said hydrophilic oil-in-water emulsifier with a lipophilic emulsifier, wherein there is sufficient hydrophilic emulsifier present to render the overall mixture hydrophilic; said particulate hydrocarbon wax having a particle size of 1 to 5 microns, the ratio of total emulsifier to said particulate hydrocarbon wax being about 3 to 20 percent by weight.

2. The composition of claim 1 wherein the conditioning agent is ultra-fine silica.

3. The composition of claim 1, wherein the hydrophilic oil-in-water emulsifier is selected from the group consisting of sodium lauryl sulfate and sodium N-methyl-N-oleoyl taurate.

4. The composition of claim 1 wherein the lipophilic emulsifier is selected from the group consisting of partial esters of fatty acids.

5. The composition of claim 1 additionally comprising up to 5 percent based on the weight of the hydrocarbon wax of a sodium lignin sulfonate dispersing agent.

6. A textile lubricating water-wettable wax composition consisting essentially of a particualte hydrocarbon wax having a chain length of from about 30 to 55 carbon atoms, a melting point ranging from about 65°C. to about 105°C., and a penetration ranging from about 1 to about 6; about 1 to 10 percent based on the weight of said hydrocarbon wax of ultra-fine silica; and an emulsifier selected from the group consisting of:

a. a hydrophilic oil-in-water emulsifier selected from the group consisting of sodium lauryl sulfate and sodium N-methyl-N-oleoyl taurate, said emulsifier having an HLB of from about 10 to about 20, and b. mixtures of said hydrophilic oil-in-water emulsifier with a lipophilic emulsifier selected from the group consisting of partial esters of fatty acids, wherein there is sufficient hydrophilic emulsifier present to render the overall mixture hydrophilic; said particulate hydrocarbon wax having a particle size of 1 to 5 microns, the ratio of total emulsifier to said particulate hydrocarbon wax being about 3 to 20 percent by weight.

7. The composition of claim 6 wherein said composition additionally contains up to 5 percent based on the weight of the hydrocarbon wax of a sodium lignin sulfonate dispersing agent.

8. A method of preparing a textile lubricating water-wettable wax composition comprising:

a. mixing at substantially ambient temperature a particulate hydrocarbon wax having a chain length of from about 30 to 55 carbon atoms, a melting point ranging from about 65°C. to about 105°C., and a penetration ranging from about 1 to about 6, with 1 to 10 percent by weight based on the weight of the hydrocarbon wax of a conditioning agent selected from the group consisting of finely ground calcium silicate, magnesium silicate and precipitated ultra-fine silica, and an emulsifier selected from the group consisting of: a hydrophilic oil-in-water emulsifier having an HLB of from about 10 to about 20, and mixtures of said hydrophilic oil-in-water emulsifier with a lipophilic emulsifier, wherein there is sufficient hydrophilic emulsifier present to render the overall mixture hydrophilic; the ratio of total emulsifier to said particulate hydrocarbon wax being about 3 to 20 percent by weight;

b. grinding the mixture from step (a) in a jet mill to thereby form a particulate product having a particle size of about 1 to 5 microns, the emulsifier being uniformly dispersed in said wax particles.

9. The method of claim 8 wherein the hydrophilic oil-in-water emulsifier is selected from the group consisting of sodium lauryl sulfate and sodium N-methyl-N-oleoyl taurate and the conditioning agent is ultra-fine silica.

10. The method of claim 8 wherein the lipophilic emulsifier is selected from the group consisting of partial esters of fatty acids and the conditioning agent is ultra-fine silica.

11. The method of claim 8 wherein in step (a) up to 5 percent based on the weight of the hydrocarbon wax of a sodium lignin sulfonate dispersing agent is incorporated into the mixture and the conditioning agent is ultra-fine silica.

* * * * *